United States Patent [19]
Barrett et al.

[11] Patent Number: 5,199,069
[45] Date of Patent: Mar. 30, 1993

[54] AUTOMATIC ENCRYPTION SELECTOR

[75] Inventors: Steven T. Barrett, Plantation; Bruce D. Oberlies, Coral Springs, both of Fla.

[73] Assignee: Motorola, Inc., Schaumburg, Ill.

[21] Appl. No.: 660,186

[22] Filed: Feb. 25, 1991

[51] Int. Cl.$^5$ .............. H04K 1/00; H04K 9/00; H04L 9/02

[52] U.S. Cl. .......................... 380/28; 380/21; 380/47; 380/2

[58] Field of Search .............. 380/28, 47, 21, 1, 2

[56] References Cited

U.S. PATENT DOCUMENTS 4,819,267 4/1989 Cargile et al. .............. 380/23
4,914,697 4/1990 Dabbish et al. .............. 380/28
5,091,938 2/1992 Thompson et al. .............. 380/21

Primary Examiner—Stephen C. Buczinski
Attorney, Agent, or Firm—Pedro P. Hernandez

[57] ABSTRACT

A radio (100) capable of automatically selecting an encryption algorithm from among a plurality of algorithms (122 and 124) is disclosed. The method for automatically selecting the proper encryption hybrid includes the steps of: attempting to decrypt the encrypted signal with one of the plurality of encryption algorithms; determining if the encryption algorithm used to decrypt the encrypted signal matches the encryption algorithm used by the encrypted signal; and developing a control signal upon the proper matching of the encryption algorithms.

6 Claims, 5 Drawing Sheets

AUTOMATIC ENCRYPTION SELECTOR

TECHNICAL FIELD

This invention relates to digitally encoded communication signals, and more specifically to a method and means for automatically selecting an encryption algorithm.

BACKGROUND

Communications between radio communication devices such as portable radios, mobiles, and fixed equipment are readily susceptible to interception by eavesdroppers. If security of communications is important to radio communication equipment users, it can be achieved with a system such as the Motorola Digital Voice Protection System. This is a system that converts an analog communication signal into a digital bit stream by use of a continuously-variable-slope delta modulator ("CVSD") which is a bit synchronous analog to digital conversion technique. The digital bit stream is then scrambled (encrypted) by a system to which only the sender and authorized receivers are given "keys" which allow the signal to be decrypted. When such a system is in use, the eavesdropper may detect the signals, but he receives no more than a pseudorandom signal resembling noise, since he lacks the means to decrypt the signals.

The user of a two-way radio having a digital encryption system such as the Motorola Digital Voice Protection System needs to be able to receive both "clear" (non-encrypted) communication messages, and encrypted binary form messages since a radio user wants to be able to receive both clear or encrypted messages automatically. The detection of the presence of digital signals can be carried out by a system such as that of U.S. Pat. No. 3,995,225. The patent is incorporated by reference as if set forth fully within.

If the receiver circuitry has detected the presence of an encrypted signal, it is next necessary to submit the signal to an unscrambling process. This requires that the user have available a decrypting system containing the same encryption algorithm (encryption algorithm refers to an algorithm which is used to decrypt or encrypt encrypted messages) and the specific key with which the message was encrypted. If the radio has such a system, and the message was applied to the system the encrypted message will be decrypted and will be heard as ordinary voice and/or data at the communication device receiving the message. If the user did not have the proper encryption algorithm and specific key the result would be to produce a signal with noise-like properties, which would be unintelligible. A decrypted signal can be distinguished from a signal that has not been decrypted by a circuit such as the one in U.S. Pat. No. 4,197,502. This patent is incorporated by reference as if set forth fully herein. The circuit of that patent provides a signal which can be used to mute a receiver if a digital signal has not been decoded.

In a typical encrypted communication system, groups of portable radios or mobile units communicate with each other using the same encryption algorithms, having the same specific algorithm keys. Frequently it is desirable for supervisory radios to be able to listen to different groups of users with each group having their own different encryption algorithms. A supervisor, for example, might wish to receive and talk back to scrambled messages coming in on one specific channel from different users or user groups. For example, a supervisor may wish to receive transmissions from a group of users using one type of encryption algorithm (i.e. DVP-XL TM, trademark of Motorola, Inc.) and also be able to receive messages on the same channel from another group of users using another encryption algorithm (i.e. DES-XL TM, trademark of Motorola, Inc.). Presently, the only way a user could receive the messages from the two different groups is to manually switch the encryption algorithm on the radio, or else the radio would miss one of the messages assuming the radio had one specific algorithm selected. Each of the different encryption algorithms on the radio can also carry a plurality of encryption keys, the radio can automatically choose among different keys of a particular encryption algorithm by using the technique described in U.S. Pat. No. 4,440,976. The patent is incorporated by reference as if set forth fully herein. This patent describes how to automatically pick from a group of keys belonging to one specific encryption algorithm (i.e. using DES-XL TM encryption and picking from a plurality of different keys).

A need however exists in the art for a method and means for automatically selecting between different encryption algorithms (e.g. between DES-XL TM and DVP-XL TM, etc.). For example, different encryption algorithms such as DVP-XL TM, and DES-XL TM could be utilized in one radio and the ability of automatically selecting the correct algorithm to use in order to decrypt an incoming signal would be very useful especially for supervisory radios which need to communicate with groups of radios utilizing different encryption algorithms.

SUMMARY OF THE INVENTION

This method and means is capable of automatically selecting a proper algorithm from among a plurality of different algorithms. In one aspect of the invention, a radio includes the capability of automatically choosing a algorithm which properly decrypts the encrypted signal. The radio checks among a plurality of algorithms in order to find the algorithm which matches the algorithm that was used to encrypt the digital signal. In another aspect of the invention, a method for automatically selecting from among a plurality of different algorithms includes the steps of: attempting to decrypt the encrypted signal; determining if the algorithm chosen to decrypt the encrypted signal has properly decrypted the encrypted signal; and developing a control signal once a the encrypted signal has been properly decrypted.

DETAILED DESCRIPTION OF THE PREFERRED EMBODIMENT

Figure 1:
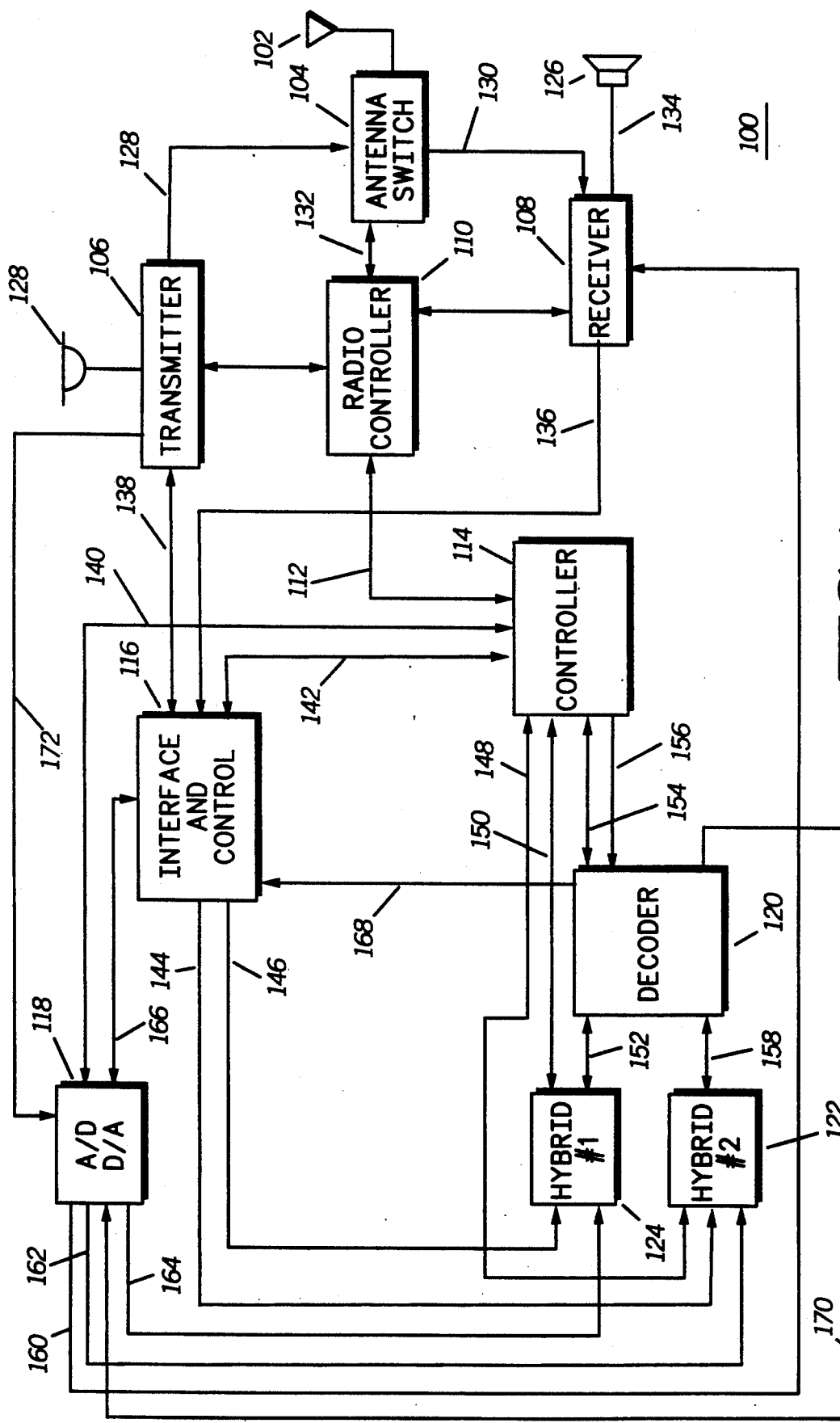
FIG. 1 is a block diagram of a radio utilizing the present invention.

Referring now by characters of reference to the drawings and first to FIG. 1, a block diagram of a radio 100 utilizing the present invention is shown. The radio 100 consists of a conventional transmitter 106 and conventional receiver 108 selectively coupled to an antenna 102 via antenna switch 104. Microphone 128 is coupled to transmitter 106 in order to convert voice signals to electrical signals which can be acted upon by transmitter 106. Transmitter 106 then transmits radio frequency (R.F.) signals via line 128 to antenna switch 104 which in turn routes the R.F. signal to antenna 102. Receiver 108 receives incoming R.F. signals via line 130 and presents these signals as voice messages via line 134 to speaker 126. Preferably radio 100 is controlled by radio controller 110 which can be any one of a number of conventional microprocessors known in the art preferably having onboard memory and I/O capabilities. Radio controller 110 controls the overall operation of radio 100. Radio controller 110 controls antenna switch 104 via line 132 in order to automatically route outbound/inbound messages to both transmitter 106 and receiver 108. Also part of the present invention is controller 114 which acts as the controller for the overall encryption circuit operation. Controller 114 is coupled to radio controller 110 via address/data bus 112 which allows both controllers 110 and 114 to communicate with each other. Controller 114 is also coupled to the interface and control 116 circuit and CVSD converter 118 via data/address buses 142, and 140 respectively. Bus 166 is used to exchange control information between CVSD converter 118 and interface and control circuit 116.

In order to better understand the present invention, the reception of an encrypted message by radio 100 will first be considered, and also the process involved in decoding the incoming encrypted message. Once a message (signal) is received by receiver 108, the signal is recovered by the receiver discriminator circuitry and routed to the interface and control circuitry 116 via line 136, interface and control circuit 116 then determines if the signal is encrypted or clear (non-encrypted). If the signal is determined to be encrypted, the signal is synchronized with a clock recovery circuit found in the interface and control circuit 116 which in turn synchronizes a free-running receiver clock circuit which is part of receiver 108 in order to synchronize the incoming signal. Part of interface and control circuit 116 includes a data regeneration circuit which reshapes the signal into a 12 Kbit/second binary signal (the same signal that left the encryption encoder of the transmitting radio).

The binary signal is then sent to the encryption hybrid (124 or 122) which had been previously selected by the user (as by the conventional operation of a switch on the radio). Encryption hybrids 122 or 124 are encryption circuits, and in particular, they are circuits capable of storing algorithms which allow for the encryption and decryption of messages (signals) which are transmitted or received respectively by radio 100. We will assume for this discussion that the default hybrid (the hybrid currently selected by the radio user) is hybrid 124. The binary signal (cipher text in) in this case is sent from the interface and control circuit 116 to hybrid 124 via bus 146. If hybrid 122 had been the default hybrid the signal would have been sent via bus 144. Once hybrid 124 receives the binary signal an attempt is made using the encryption algorithm residing in hybrid 124 (i.e. DES-XL) to decode the encrypted digital signal. If it is determined by hybrid 124 that the same algorithm that was used to encrypt the incoming digital signals resides in hybrid 124, in this case DES-XL, then hybrid 124 sends out a control signal. In this particular case since the hybrid uses DES-XL algorithm the control signal is an "in synch message" via the hybrid synch line 150 to controller 114.

The DEX-XL algorithm and other Motorola, Inc. "XL" algorithms use a type of encryption known in the art as output feedback which is a self synchronizing serial process which determines that a correct decryption of a signal has occurred when synchronization is achieved between the encrypted message and the decryption algorithm which is what determines that the encrypted signal has been properly decrypted, and a proper control signal is then generated by the hybrid 124. The means for developing the control signal in this case is accomplished by generating an output signal (either high or low voltage level on one of the I/O lines of bus 150) once the algorithm in hybrid 124 becomes in synch to the encrypted signal. For other types of algorithms (i.e. non-XL types of algorithms) such as algorithms using cipher feedback techniques other methods of generating a valid output signal as known in the art can be utilized to inform that a proper decryption has been achieved.

If the in synch message is received, controller 114 knows that the proper encryption algorithm (hybrid) is being used to decrypt the incoming signal. On the other hand, if the in synch message is not received within a certain period of time, the controller 114 will automatically send a signal via line 156 to decoder 120 in order to switch the currently selected data bus from bus 152 to data bus 158 (hybrid 124 to hybrid 122).

Decoder 120 is a multiplexer which controls buses 152 and 158 in order to select one of the two buses in order to carry data from the selected hybrid (122 or 124) to controller 114 via bus 154. Data such as key information, write enable signals, etc. are carried between the hybrids and controller 114. Decoder 120 also routes signals from hybrids 122 and 124 to the interface and control circuit 116 via bus 168, and also to the CVSD converter 118 via bus 170 when required. Decoder 120 is switched by controller 114 which controls the routing of signals through decoder 120. Controller 114 informs the interface and control circuit 116 of any hybrid change in order for it to know that a new hybrid has been selected. Again, an "in synch message" is looked for coming from line 148 at controller 114. If the incoming signal does not match any of the encryption hybrids in radio 100 the controller 114 will stop the hybrid selection process and return to the previously selected default hybrid.

Assuming that an "in synch message" (control signal) is detected coming from hybrid 122, then hybrid 122 remains selected in order to decrypt the incoming binary signal. The control signal informs controller 114 that hybrid 122 has a decryption algorithm that matches the algorithm that was used to encrypt the incoming signal, and the signal is then decoded in hybrid 122 in order to produce a 12 Kbit/second digital voice signal (same as that produced by the CVSD A/D converter of the transmitting radio). The digital voice signal which is normally called decoded RX data or plain text out is then sent via bus 158 through decoder 120 and through bus 170 to the CVSD converter 118 which performs a digital to analog conversion of the digital voice signal which, in turn, is routed via line 160 as a decrypted analog signal to receiver 108. Receiver 108 finally presents the resulting analog voice message via speaker 134 to the user. If the selected hybrid would have been hybrid 124 the digital voice signal would have been sent via bus 152 through decoder 120 and through bus 170 to the CVSD converter 118 for performance of the digital to analog conversion.

If the specific encryption key which is presently being used does not match the key used in the encryption process, the CVSD converter 118 will send a "no proper code" message via bus 140 to controller 114, which, depending if the option to only unmute on proper code has been set, will not unmute receiver 108. Unmute on proper code is normally selected since if the specific encryption key presently selected and the key used to encrypt the incoming signal do not match, only noise will be heard at speaker 126, since the digital signal will not have been properly decrypted. If the incoming digital signal is properly decrypted by converter 118 (encryption keys matched) then a proper code detected message is sent to controller 114 which in turn notifies controller 110 that it is proper to unsquelch the receiver 108.

Although radio 100 is shown with only two encryption hybrids 124 and 122, one skilled in the art will realize that any number of encryption algorithms can be utilized. The only changes required in order to support greater numbers of encryption hybrids, is to add more capabilities to the decoding means which is used to select the individual encryption hybrids. Added hybrid capability can be accomplished by adding more input ports to controller 114 in order to receive the control signal messages from the different hybrids, and by adding more address/data bus capabilities to decoder 120 in order to allow for the transfer of information from the greater number of encryption hybrids with each one of the hybrids having there own data buses.

The sequence utilized when radio 100 wants to transmit an encrypted message will now be considered in order to understand how the transmission sequence operates. It will be assumed that the radio is using encryption hybrid 124 as the default encryption hybrid. Once transmitter 106 is "keyed up", a users voice message is picked up by microphone 128 and translated into an electrical signal which transmitter 106 can utilize. The analog signal is then sent via bus 172 to the CVSD converter 118. The analog signal is then converted to a 12 kbit/sec digital voice signal by converter 118 by performing an analog to digital conversion. The digital voice signal (plain text in) is then routed via bus 164 (bus 162 if hybrid 122 had been the selected hybrid) to encryption hybrid 124 in order to encrypt the digital voice signal assuming hybrid 124 was the default hybrid. Once the signal is encrypted (cipher text out), it is routed via bus 152 through decoder 120 to the interface and control circuit 116 via bus 168, and finally through bus 138 to transmitter 106. Transmitter 106 then converts the encrypted signal into an R.F. signal for transmission. If the selected hybrid had been hybrid 122 the cipher text out would have gone through bus 158 through the decoder 120 to the interface and control circuit 116 and finally through bus 138 to transmitter 106.

Radio controller 110 can inform controller 114 at any time as to when the radio user wants to change either encryption hybrids 124 and 122, or change the key the encryption hybrid (i.e. hybrid 124) is using, by sending a message to controller 114 which can automatically select either a different key for the different hybrids, or select different hybrids depending on the radio user's command (e.g. changes to a new communication channel which has a different encryption algorithm strapped to it).

Figure 2:
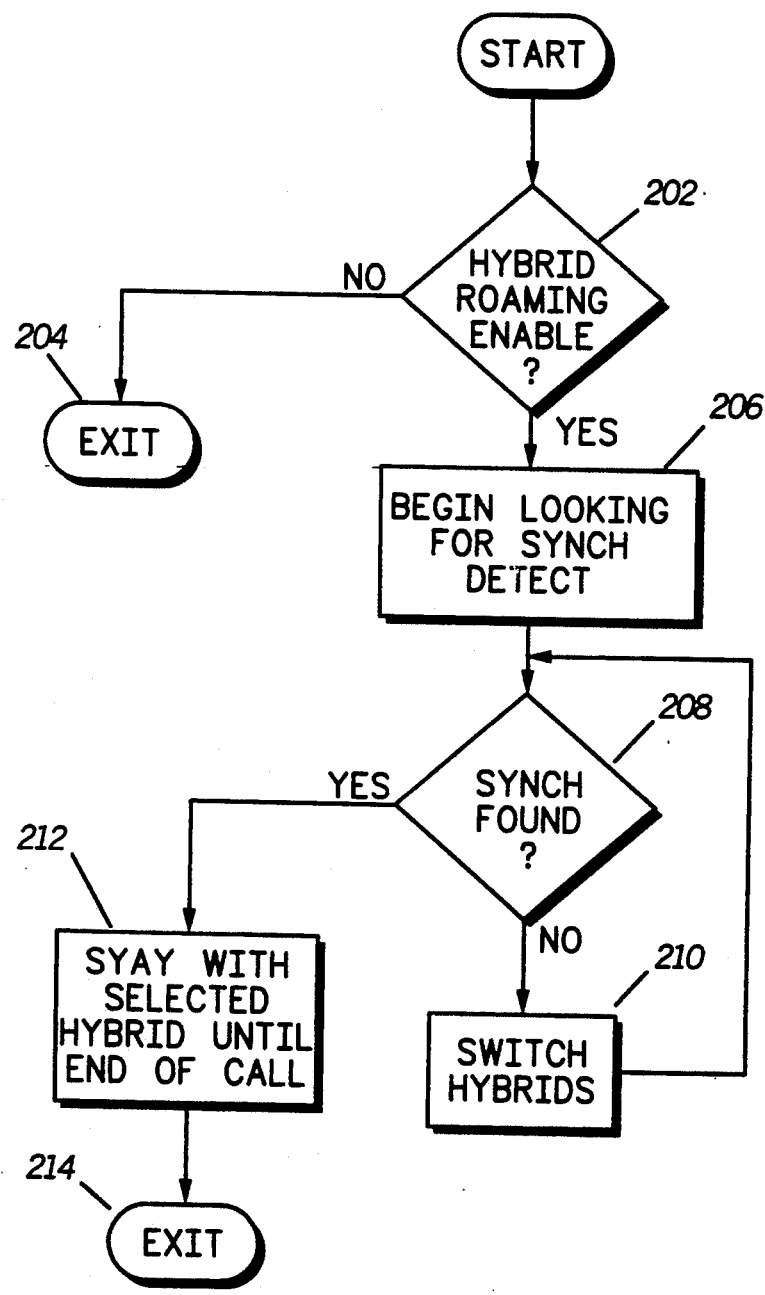
FIG. 2 is a flowchart of the operation of the radio of FIG. 1 when an encrypted signal is received.

In Fig. 2, the software algorithm which is stored in radio controller 110 and executed by controller 110 once an encrypted message (signal) is received by radio 100, is shown. When the signal is received it is routed from receiver 108 to interface and control circuit 116, which in turn determines if the received signal is indeed a coded signal. If the signal is determined to be "clear" (nonencrypted) the encryption circuit is not utilized, but if it is determined that the signal is encrypted, then controller 110 executes an encryption hybrid selection routine in accordance with the present invention. In step 202 the algorithm determines if "hybrid roaming" (automatic encryption algorithm selection) is enabled. In other words is the present invention of selecting from among different encryption hybrids turned on, or is the radio 100 going to look only at the presently selected hybrid 124 or 122. If automatic hybrid selection is not enabled, the program exits at step 204. If hybrid roaming is selected, the step 206 has controller 114 commence to look for the in synch signal coming in on line 150 or 148 depending on which hybrid 124 or 122 is presently selected. Step 208 determines if the currently selected encryption hybrid (124 or 122) has properly decrypted the incoming encrypted signal. If the two algorithms match, an in synch signal (control signal) is sent to controller 114 from hybrid 124 (assuming this is the currently selected hybrid) and the routine in step 212 keeps the same encryption hybrid selected for the duration of the incoming signal even though this was not the user default hybrid. If the in synch signal is not found once the encrypted signal enters hybrid 124, step 210 switches the selected hybrid to hybrid 122 as explained previously, which is by sending a signal to decoder 120 to change buses from bus 152 to bus 158 and enables the new hybrid. After the hybrids are switched, the routine again looks for a synch signal (control signal) in step 208 which informs the controller 114 that the correct encryption algorithm has been selected. If again no in synch signal is detected after trying all of the hybrids, the default hybrid is reselected but no message is sent to radio speaker 134 since successful decryption was not capable.

Figure 3:
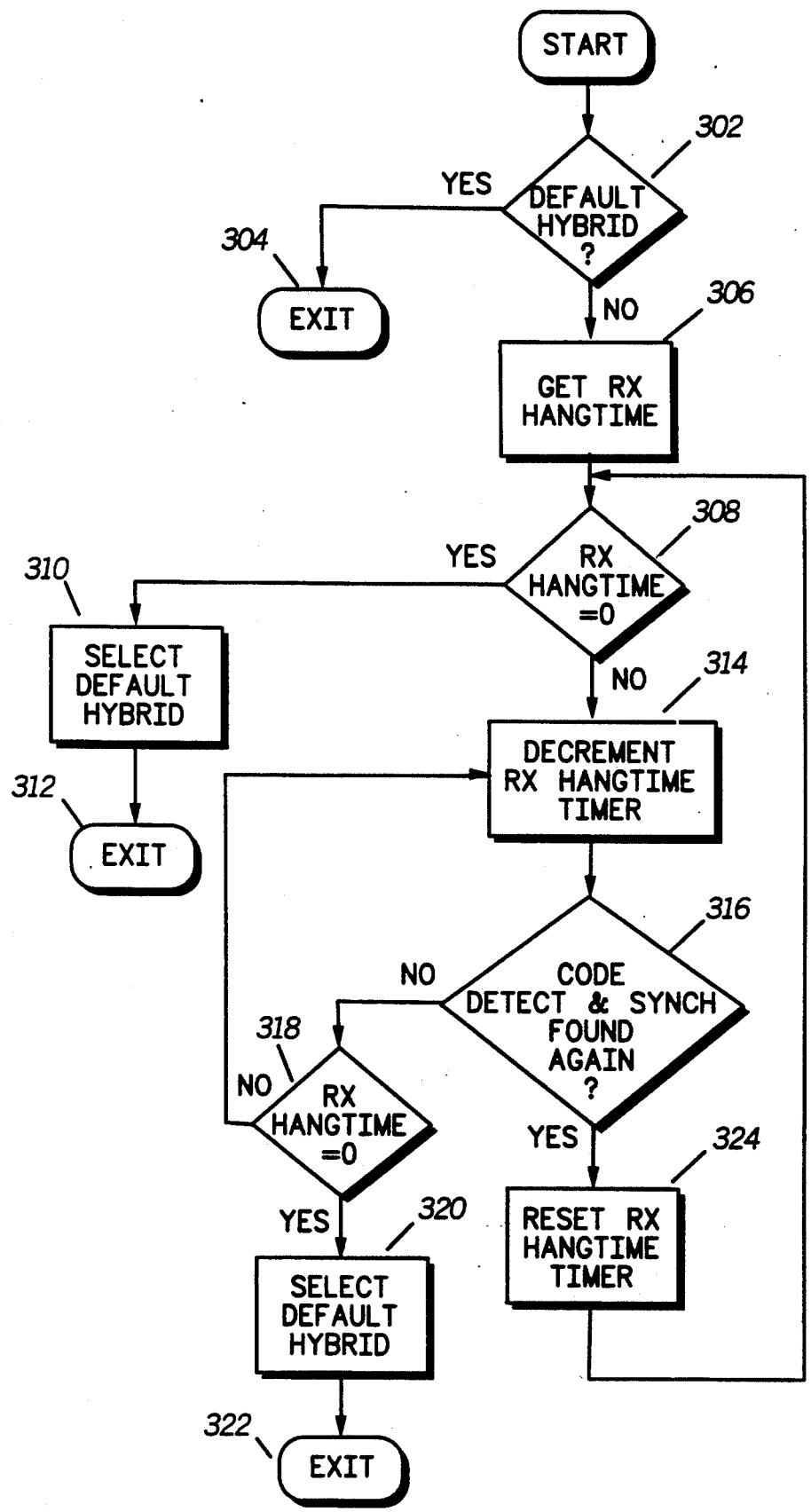
FIG. 3 is a flowchart showing the steps that occur after the encrypted signal has terminated in accordance with the present invention.

FIG. 3 shows a flow chart of the steps which occur after an incoming encrypted message has terminated. In step 302, the radio controller 110 first determines whether or not the user default encryption hybrid is currently selected. The default hybrid is the hybrid currently selected by the radio user. If the default hybrid is currently selected, the controller exits the routine in step 304 and does not change anything. If the default hybrid is not currently selected (which occurs when a previous encrypted message was encrypted with an encryption algorithm found in another hybrid other than the default hybrid) the routine goes to step 306, where the receive hangtime is retrieved from the controller's memory. Receive hangtime is the amount of time the radio 100 will keep the automatically chosen hybrid selected after the termination of an incoming message. This allows a radio user to receive subsequent messages even though the messages are encrypted with an encryption algorithm that is not the encryption algorithm which the radio user had selected (i.e. the default hybrid). If the receive hangtime is equal to zero, step 308, the default hybrid is selected in step 310 and the routine is exited in step 312. In step 314, controller 114 begins to decrement the receive hangtime timer which is stored preferably in onboard memory which is part of controller 114. In step 316, the radio receiver 108 is looking for an incoming encrypted message, and controller 114 is waiting to determine if the incoming signal is using the same encryption algorithm as the one that is presently selected. If the incoming signal is using the same encryption algorithm as the radio has currently selected, then the receive hangtime timer is reset in step 324, and the routine is sent back to step 308. If the incoming signal is not using the same algorithm, in step 318 the receive hangtime timer is checked to see if it has reached zero, if not, steps 314 and 316 are repeated. If the receive hangtime timer has reached zero without a new encrypted signal having been received by receiver 108, the user default encryption hybrid is reselected (124 or 122) and the routine is exited in step 322.

Figure 4:
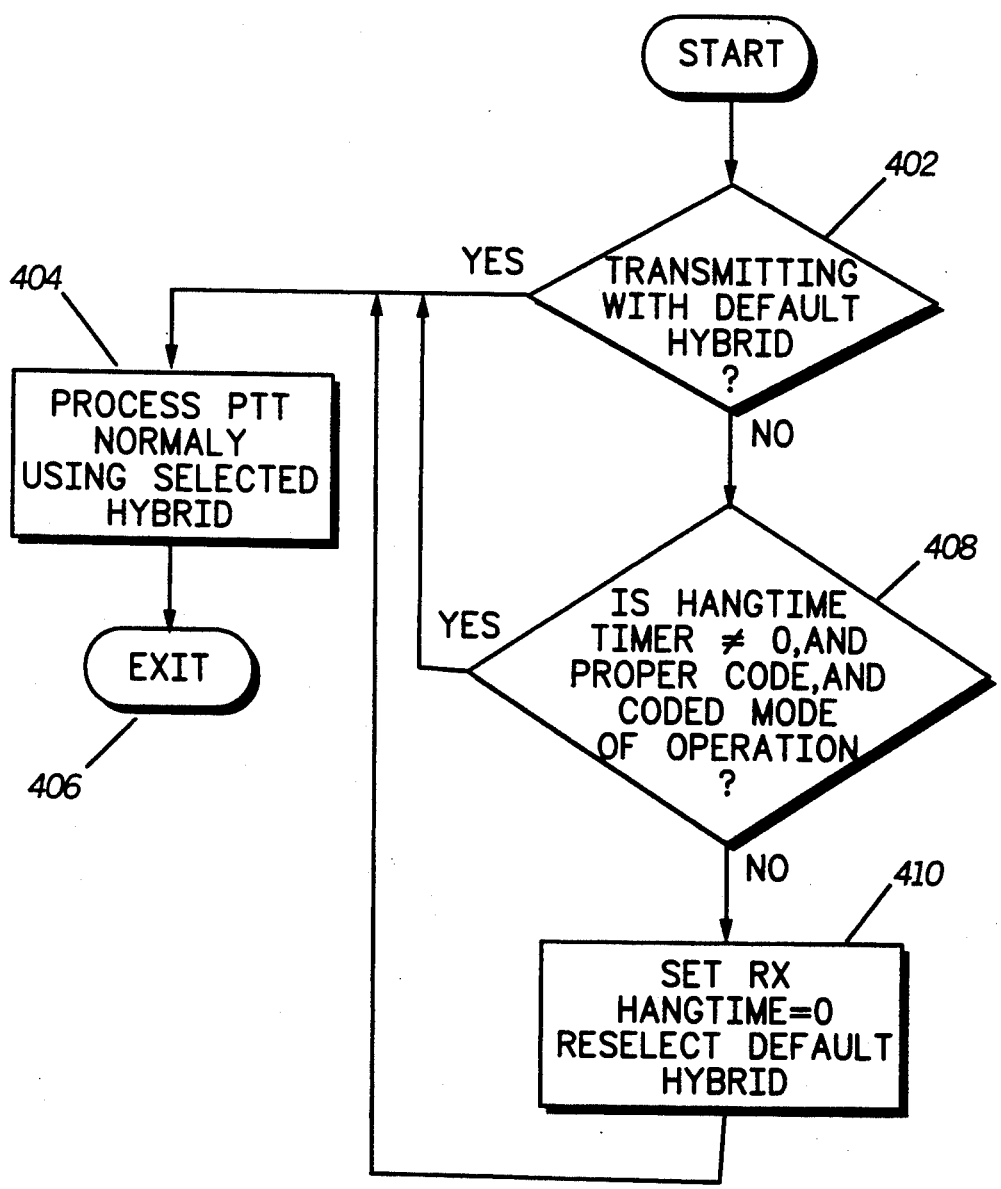
FIG. 4 is a flowchart showing the steps that occur anytime the radio push to talk switch is pressed in accordance with the present invention.

In FIG. 4 a flowchart of what occurs when the radios push to talk is pressed and the radio is not in transmit hangtime is shown. Transmit hangtime is the amount of time after transmitting with an encryption hybrid other than the default hybrid that another transmission can occur without reverting back to the default hybrid. In step 402, it is determined if the radio 100 has the default hybrid currently selected. If the default hybrid is determined to be currently selected, the PTT is processed normally using the default hybrid in step 404, and the program is exited in step 406. If it is found that the transmit hangtime delay timer does not equal zero, and that radio is in the encrypted mode of operation (user wants to transmit encrypted messages) then the radio 100 will transmit with the currently selected hybrid in step 404 (in this case the selected hybrid is not the default hybrid), and then routine is exited in step 406. If all the conditions in step 408 are not found to be true, then in step 410, the receive hangtime is set to zero and the default hybrid is reselected. Finally, the transmission is transmitted using the default hybrid in step 404 and the routine exited in step 406.

Figure 5:
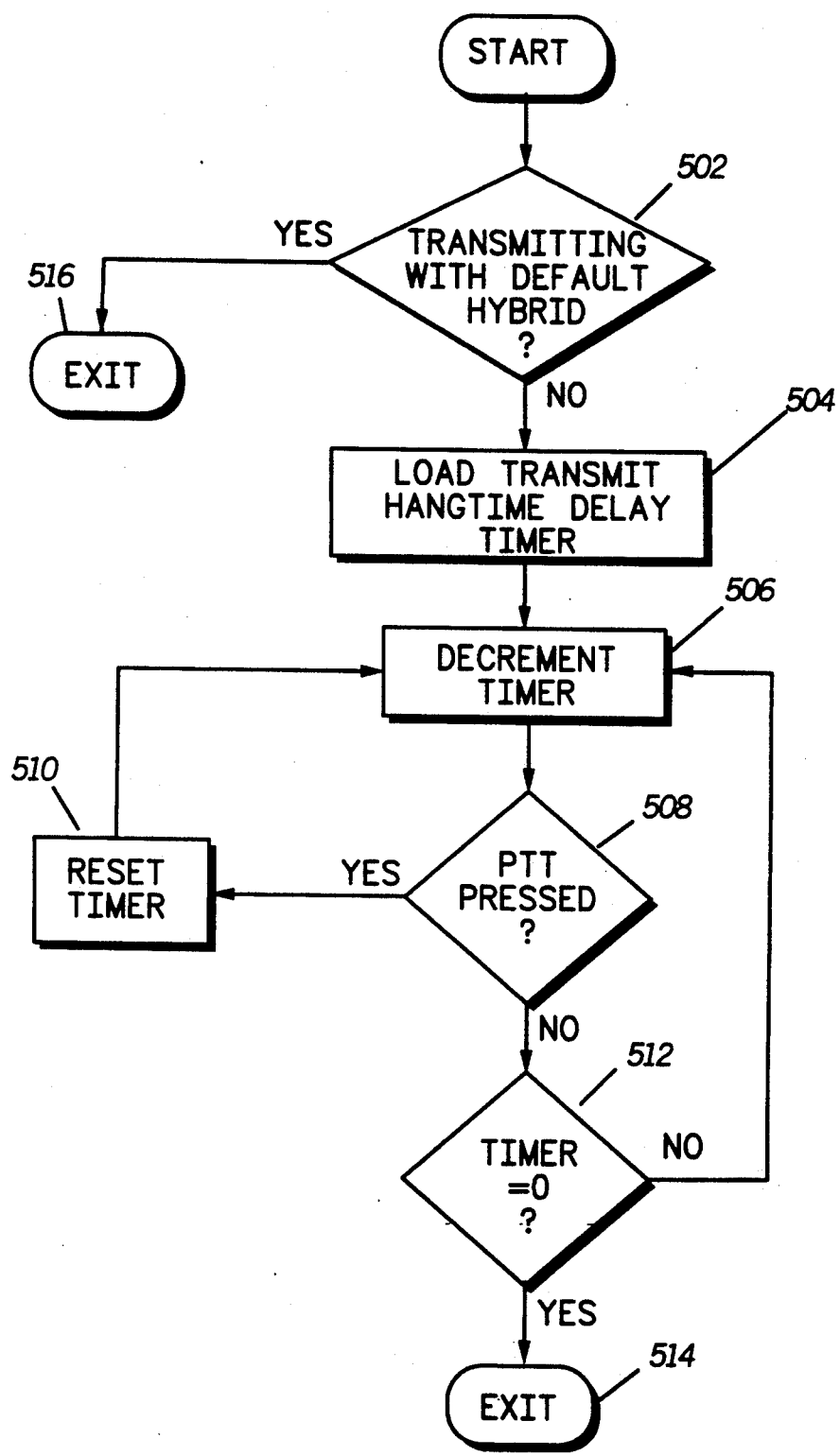
FIG. 5 is a flowchart showing the steps that occur after the radio push to talk switch is released in accordance with the present invention.

FIG. 5 illustrates a flowchart of the steps involved once the push to talk button is released by the radio user after completing any encrypted transmission. In step 502, it is first determined if radio 100 was transmitting with the user default encryption hybrid. If the last transmission prior to releasing the PTT was with the default hybrid, the routine is automatically exited in step 516. If the last transmission was not with the default encryption hybrid, step 504 loads the transmit hangtime delay timer and the timer is decremented in step 506. In step 508, the routine looks to see if the PTT has been pressed again, if yes, the routine resets the timer in step 510, and returns to step 506. If PTT has not been pressed again, step 512 determines if the transmit hangtime timer has decremented to zero, if yes, the routine selects the default hybrid and exits in step 514. If the timer has not reached zero, the routine goes back to step 506.

In summary, the present invention provides a radio 100 which has more than one unique encryption algorithm (encryption hybrids 122 and 124) the ability to automatically determine if the incoming signal matches (achieves proper decryption) anyone of the hybrids (algorithms) in the radio 100. If any of the hybrids match and it is not the currently selected hybrid, the radio 100 selects the new hybrid and sets a transmit hangtime which allows the radio 100 to transmit with the new encryption algorithm within a predetermined time period (amount of time in transmit hangtime timer) before reverting back to the defaulted hybrid. By having more than one encryption algorithm residing in a radio, a radio user can communicate with other radio users which are using different encryption algorithms. One skilled in the art will realize that the present invention can be combined with the invention disclosed in U.S. Pat. No. 4,440,976, which describes how to automatically pick from a group of keys belonging to one specific encryption algorithm. By combining the two inventions into one radio 100, radio 100 could not only automatically select from a plurality of encryption algorithms, but could also once the correct encryption algorithm is matched, to locate simultaneously the correct encryption key that the incoming encrypted signal is using.

Summarizing the steps involved in automatically selecting a proper encryption algorithm from among a plurality of different algorithms includes the steps of: attempting to decrypt the encrypted digital signal with one of the plurality of different algorithms; determining if the algorithm chosen to decrypt the encrypted signal has properly decrypted the encrypted signal; and developing a control signal upon the proper decryption of the encrypted signal in order to indicate correct encryption. While the present invention has been described in conjunction with specific embodiments, it is evident that many alternatives, modifications and variations will be apparent to those skilled in the art in light of the foregoing description. For example, instead of using a radio controller 110 and an encryption circuit controller 114, one larger controller could be used. Accordingly it is intended that the present invention embrace all such alternatives, modifications, and variations as fall within the spirit and broad scope of the appended claims.

What is claimed is:

1. A radio capable of automatically selecting a proper algorithm from among a plurality of different algorithms, each having an associated key, for decrypting an encrypted signal which is received by the radio and one of the plurality of algorithms in the radio is designated to be a default algorithm, the radio comprising:
   a. means for automatically decrypting the received encrypted signal with one of the plurality of different algorithms;
   b. means for determining if the algorithm chosen to decrypt the encrypted signal has properly decrypted the encrypted signal and selecting another algorithm from among the plurality of algorithims if the encrypted signal has not been properly decrypted: and
   c. means for developing a control signal upon the proper decryption of the received encrypted signal in order to indicate correct decryption.

2. A radio as defined in claim 1, wherein the control signal is a signal which is produced by an encryption hybrid which stores the algorithm used to properly decrypt the encrypted signal.

3. A radio as defined in claim 1, further comprising
   d. means for setting a transmit hangtime timer upon a control signal being developed and the default algorithm not being presently selected.

4. A radio as defined in claim 1, further comprising:
   d. means for setting a receive hangtime delay timer once a control signal is developed if the algorithm which is being used to decrypt the encrypted signal is not the default encryption algorithm.

5. A radio as defined in claim 1, further comprising:
d. means responsive to the means for developing a control signal, for transmitting an encrypted message using the algorithm that was used to properly decrypt the received encrypted message even when the algorithm used to decrypt the received encrypted signal is not the default algorithm.

6. A radio as defined in claim 5, further comprising:
d. means responsive to the means for developing a control signal, for reverting to the default algorithm after a predetermined period of time has passed since the received encrypted signal has been properly decrypted.

* * * * *